Patented Oct. 27, 1942

2,299,948

UNITED STATES PATENT OFFICE 2,299,948

9,9 DI-(β-CARBAMYL-ETHYL) FLUORENE

Herman A. Bruson, Philadelphia, Pa., assignor to The Resinous Products & Chemical Company, Philadelphia, Pa., a corporation of Delaware No Drawing. Application November 13, 1941, Serial No. 419,018

1 Claim. (Cl. 260—558)

This invention relates to 9,9-di-(β-carbamyl-ethyl) fluorene, a new compound having the formula

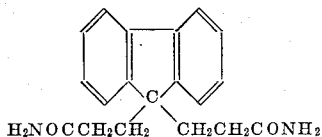

H₂NOCCH₂CH₂      CH₂CH₂CONH₂ and a method for its preparation.

9,9-di-(β-carbamyl-ethyl) fluorene is a valuable intermediate for the preparation of synthetic resins.

According to this invention, 9,9-di-(β-cyano-ethyl) fluorene (obtainable from fluorene and acrylonitrile by condensation in the presence of alkali as described in my co-pending application Serial No. 391,501, filed May 2, 1941) is reacted with aqueous sulfuric acid. It is desirable to use a solution of about 83% strength as this contains the optimum ratio of water and acid. The reaction is preferably carried out in the presence of an inert organic solvent for the dinitrile at a temperature from about 50° to 110° C. to form 9,9-di-(β-carbamyl-ethyl) fluorene. The reaction is practically quantitative if the proportions chosen are such that two molecular equivalents each of sulfuric acid and water are available for each mol of the dinitrile employed. Inert solvents for the reaction medium are such solvents as the aromatic hydrocarbons including benzene, toluene, and xylene, or chlorinated hydrocarbons such as chlorobenzene, dichlorobenzene, and ethylene dichloride, or the like. The reaction product is isolated by removing acidic by-products by means of aqueous alkali.

The following examples illustrate this invention.

Example 1

To a solution consisting of 250 cc. of ethylene dichloride and 136 g. of 9,9-di-(β-cyanoethyl) fluorene (M. P. 121° C.) there was added dropwise a solution of 100 g. of 98% sulfuric acid and 18 g. of water while the reaction mixture was stirred and maintained between 60° and 70° C. After the addition, which required about 1½ hours, the mixture was heated for five hours longer with continuous stirring at 65-70° C. The ethylene dichloride layer was removed and the remaining lower viscous layer neutralized with a 25% sodium hydroxide solution while the mixture was stirred and cooled to 20-25° C. The white crystalline product which separated was filtered off, washed thoroughly with water and dried. The yield was 111 grams. Upon recrystallization from glycol monoethyl ether ("Cellosolve"), it formed colorless crystals melting at 250-252° C.

Example 2

To a stirred solution consisting of 300 cc. of benzene and 136 g. of 9,9-di-(β-cyanoethyl) fluorene maintained at 75° C. there was added dropwise during the course of two hours a solution of 105 g. of 98% sulfuric acid and 22 g. of water. After the addition was completed, the mixture was stirred for three hours at 75-80° C., then cooled, and the benzene layer removed. The viscous lower layer was neutralized in the cold with sodium carbonate solution and the precipitated crystalline product filtered off, washed, and dried.

I claim:

As a new compound, 9,9-di-(β-carbamyl-ethyl) fluorene, having the formula:

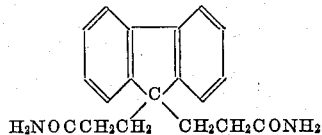

H₂NOCCH₂CH₂      CH₂CH₂CONH₂

HERMAN A. BRUSON.